United States Patent
Brodey et al.

(10) Patent No.: US 11,130,145 B2
(45) Date of Patent: Sep. 28, 2021

(54) ADJUSTABLE ESCUTCHEON ASSEMBLY

(71) Applicant: Durst Corporation, Inc., Cranford, NJ (US)

(72) Inventors: Lawrence B. Brodey, South Orange, NJ (US); Christopher Pike, Pennington, NJ (US); Anthony Folk, Whitehouse Station, NJ (US)

(73) Assignee: Durst Corporation, Inc., Cranford, NJ (US)

( * ) Notice: Subject to any disclaimer, the term of this patent is extended or adjusted under 35 U.S.C. 154(b) by 0 days.

(21) Appl. No.: 17/019,012

(22) Filed: Sep. 11, 2020

(65) Prior Publication Data
US 2020/0406285 A1    Dec. 31, 2020

Related U.S. Application Data

(63) Continuation-in-part of application No. 16/669,105, filed on Oct. 30, 2019, which is a continuation of
(Continued)

(51) Int. Cl.
*E03C 1/04* (2006.01)
*B05B 15/652* (2018.01)
(Continued)

(52) U.S. Cl.
CPC .............. *B05B 15/652* (2018.02); *B05B 1/18* (2013.01); *B05B 15/654* (2018.02); *E03C 1/021* (2013.01);
(Continued)

(58) Field of Classification Search
CPC .... E03C 1/021; E03C 1/0408; E03C 2201/50; F16L 5/00; Y10T 137/6977
See application file for complete search history.

(56) References Cited

U.S. PATENT DOCUMENTS

| 931,950 A | 8/1909 | Mueller |
| 1,218,879 A | 3/1917 | Luzzi |

(Continued)

FOREIGN PATENT DOCUMENTS

| CA | 2500280 A1 | 9/2005 |
| CH | 388027 A5 | 4/1997 |
| EP | 2223676 B1 | 11/2011 |

OTHER PUBLICATIONS

Office Action dated Jun. 28, 2018, issued in connection with U.S. Appl. No. 15/630,484 (9 pages).
(Continued)

*Primary Examiner* — Kevin F Murphy
(74) *Attorney, Agent, or Firm* — McCarter & English, LLP

(57) ABSTRACT

An adjustable escutcheon assembly is provided which can be installed flush against a ceiling, wall, or other surface where a supply pipe exits the ceiling, wall, or surface at various angles. The assembly includes a fitting having a curved bearing surface and an aperture for receiving the supply pipe, a retainer which bears against and is adjustable with respect to the curved bearing surface of the fitting, and an escutcheon plate mountable to the retainer. During installation, the retainer and escutcheon plate can be rotated with respect to the pipe and fitting in order to allow flush installation of the retainer and escutcheon against the ceiling, wall, or surface at a variety of angles.

11 Claims, 6 Drawing Sheets

Related U.S. Application Data application No. 15/630,484, filed on Jun. 22, 2017, now abandoned.

(51) Int. Cl.
   *B05B 1/18* (2006.01)
   *E03C 1/02* (2006.01)
   *B05B 15/654* (2018.01)
   *F16L 5/00* (2006.01)

(52) U.S. Cl.
   CPC .............. *E03C 1/0408* (2013.01); *F16L 5/00* (2013.01); *E03C 2001/028* (2013.01); *E03C 2201/50* (2013.01); *Y10T 137/6977* (2015.04)

(56) References Cited

U.S. PATENT DOCUMENTS

| | | | |
|---|---|---|---|
| 1,525,254 A | 2/1925 | Simpson | |
| 1,724,161 A | 8/1929 | Wuesthoff | |
| 1,985,502 A | 12/1934 | Isenberg | |
| 2,557,106 A | 6/1951 | Hughes | |
| 2,893,644 A | 7/1959 | Holden | |
| 3,278,201 A * | 10/1966 | Noland | F16L 5/00 285/46 |
| 3,466,064 A * | 9/1969 | Fulton | E03B 9/025 285/192 |
| 3,884,258 A | 5/1975 | Mull | |
| 4,219,158 A | 8/1980 | Lacy | |
| 4,360,160 A | 11/1982 | Jette | |
| 4,398,668 A | 8/1983 | Jette | |
| 4,490,954 A * | 1/1985 | Cresti | F16L 5/00 52/220.8 |
| 4,739,596 A * | 4/1988 | Cunningham | E03C 1/042 248/56 |
| 5,205,490 A | 4/1993 | Steinhardt et al. | |
| 5,211,695 A * | 5/1993 | Dowler | F16L 5/00 16/2.1 |
| 5,236,229 A * | 8/1993 | Gonzalez | F16L 5/10 137/359 |
| 5,755,463 A * | 5/1998 | Davidson | F16L 5/10 285/205 |
| 6,024,303 A | 2/2000 | Land | |
| 6,378,912 B1 * | 4/2002 | Condon | F16L 5/06 239/273 |
| 7,065,807 B1 | 6/2006 | Stout, Jr. | |
| 7,197,777 B2 * | 4/2007 | Ismert | E03C 1/042 4/252.1 |
| 7,455,247 B2 | 11/2008 | Kajuch | |
| 7,793,365 B2 | 9/2010 | Miura et al. | |
| 7,866,576 B1 | 1/2011 | Farley | |
| 8,028,935 B2 | 10/2011 | Leber | |
| 8,292,201 B2 | 10/2012 | Patterson et al. | |
| 8,360,346 B2 | 1/2013 | Furseth | |
| 8,714,463 B2 | 5/2014 | Bischoff et al. | |
| 8,733,674 B2 | 5/2014 | Kajuch | |
| 9,242,262 B2 | 1/2016 | Huffington et al. | |
| 2004/0026542 A1 | 2/2004 | Loyd et al. | |
| 2016/0074884 A1 | 3/2016 | Short | |
| 2018/0369850 A1 | 12/2018 | Brodey et al. | |
| 2020/0061659 A1 | 2/2020 | Brodey et al. | |

OTHER PUBLICATIONS

Office Action dated Apr. 30, 2019, issued in connection with U.S. Appl. No. 15/630,484 (8 pages).

Advisory Action dated Aug. 27, 2019, issued in connection with U.S. Appl. No. 15/630,484 (4 pages).

Office Action dated Jun. 3, 2021, issued in connection with U.S. Appl. No. 16/669,105 (8 pages).

\* cited by examiner

ADJUSTABLE ESCUTCHEON ASSEMBLY

RELATED APPLICATIONS

This application is a continuation-in-part of U.S. patent application Ser. No. 16/669,105 filed on Oct. 30, 2019, which is a continuation of U.S. patent application Ser. No. 15/630,484 filed on Jun. 22, 2017, the entire disclosures of which are expressly incorporated herein by reference.

BACKGROUND

Field of the Invention

The present disclosure relates to decorative escutcheons for plumbing equipment. More specifically, the present disclosure relates to an adjustable escutcheon assembly that can be used with water pipes oriented at various angles with respect to wall surfaces.

Related Art

A shower head is normally installed with a water supply pipe which provides water to the shower head. Such pipe normally extends outwardly from a wall or a ceiling, often normal to (i.e., at a 90 degree angle to) the wall or ceiling through which the pipe extends. The point at which the pipe exits the wall can look undesirable due to the hole through which the pipe extends. Because of this, decorative escutcheons are frequently used to conceal such holes, thereby providing a pleasing appearance.

However, if the pipe exits the wall or ceiling at an angle other than 90 degrees to the wall, (i.e., the pipe is not perpendicular to the wall or ceiling through which it extends), an escutcheon often cannot be used because escutcheons are often only designed for installation with pipes that are perpendicular to the wall or ceiling. Thus, if the pipe is at an angle other than 90 degrees to the wall or ceiling, the geometry of the pipe will not allow the pipe to fit through in the hole of the escutcheon, thereby preventing installation of the escutcheon. Accordingly, what is desirable is an adjustable escutcheon assembly which addresses the foregoing needs.

SUMMARY

An adjustable escutcheon assembly is provided which can be installed flush against a ceiling, wall, or other surface where a supply pipe (e.g., water pipe, electrical conduit, etc.) exits the ceiling, wall, or surface at various angles (e.g., including angles other than 90 degrees, as well as angles of 90 degrees, to the ceiling, wall, or surface). The assembly can include a spherical or cylindrical fitting having an aperture for receiving the supply pipe exiting the wall, ceiling, or surface, a retainer which bears against and is adjustable with respect to the fitting, and an escutcheon mountable to the retainer. During installation, the retainer and escutcheon can be angled with respect to the fitting in order to allow flush installation of the retainer and escutcheon against a ceiling, wall, or surface at a variety of angles.

BRIEF DESCRIPTION OF THE DRAWINGS

The foregoing features and others will be apparent from the following Detailed Description, taken in connection with the accompanying drawings, in which.

DETAILED DESCRIPTION OF THE INVENTION

The present invention relates to an adjustable escutcheon assembly, as discussed in detail below in connection with FIGS. 1-8. It is noted that the adjustable escutcheon assembly of the present disclosure could be utilized in connection with pipes of various types, such as supply and discharge pipes (e.g., water supply and water discharge pipes).

Figure 1:
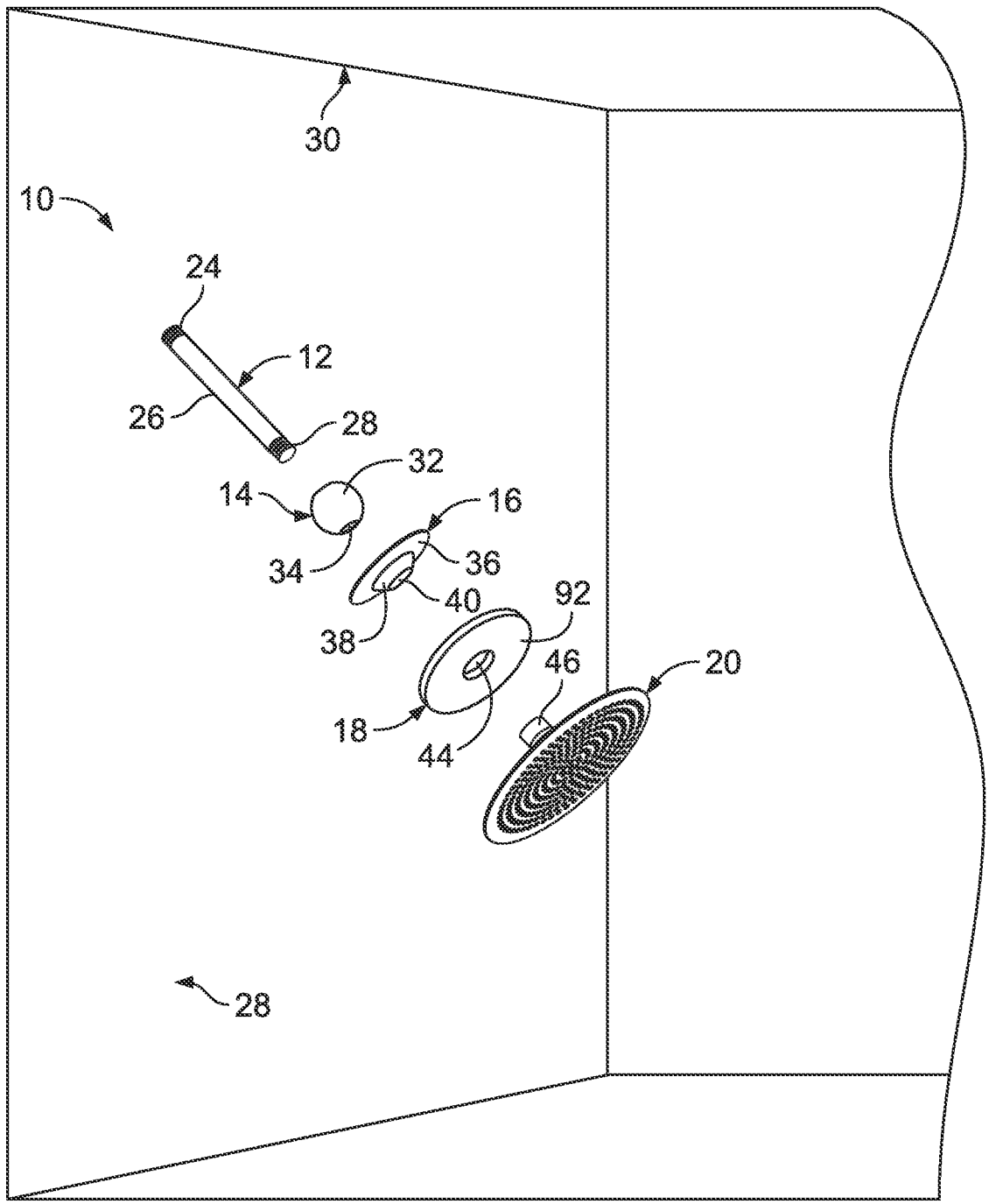
FIG. 1 is an exploded view of an escutcheon assembly of the present disclosure.

FIG. 1 is an exploded view of an assembly 10 of the present disclosure. The assembly 10 includes a ball fitting 14 which receives a water supply pipe 12, a retainer 16 that bears against and is adjustable with respect to the ball fitting 14, and a decorative escutcheon plate 18. The ball fitting 14 includes an aperture 34 and a curved bearing surface 32. The aperture 34 receives the water supply pipe 12 (which extends through the aperture 34), such that the central portion 26 of the pipe (between threaded ends 22 and 24 of the pipe) extends through the aperture 34. The threads 22 mate with a threaded connector 46 of a conventional shower head 20.

The pipe 12 also extends through an aperture 40 formed in the retainer 16. The retainer 16 includes a bearing surface 38 which bears against, and is adjustable with respect to, the bearing surface 32 of the ball fitting 14. A peripheral flange 36 is provided, and is attached to (or formed integrally with) the bearing surface 38. An interchangeable escutcheon plate 18 is also provided, and is mounted to the retainer 16. The escutcheon plate 18 includes a central aperture 44 (through which the pipe 12 extends), and a peripheral portion 42. The plate 18 could include any desired decorative surface, ornamentation, etc., in order to provide a desired aesthetic look. Both the retainer 16 and the plate 18 rotate so as to allow flush installation against a wall 28 or a ceiling 30 through which the pipe 12 extends, as discussed in greater detail below.

Figure 2:
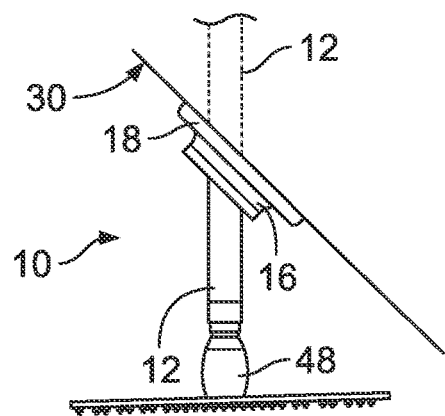
FIGS. 2-4 are side views illustrating installation of the assembly in connection with walls/ceilings at various angles to a water supply pipe.
Figure 3:
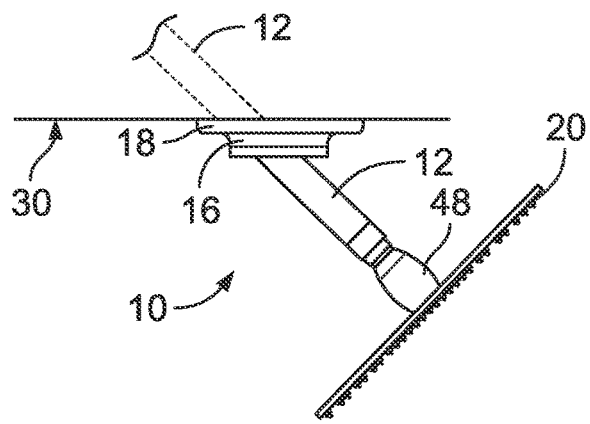
Figure 4:
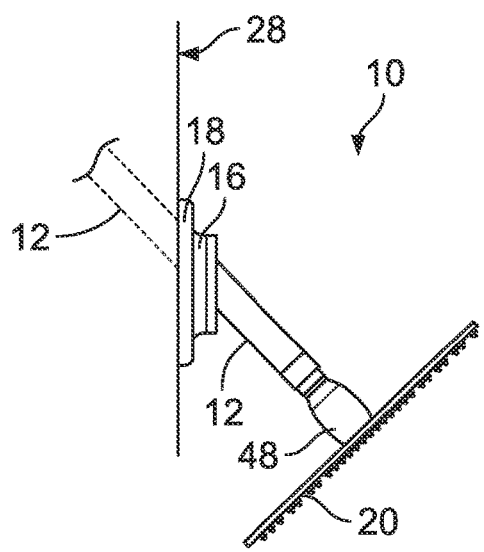

FIGS. 2-4 are side views illustrating installation of the adjustable escutcheon assembly in various configurations. For example, as illustrated in FIG. 2, the ceiling 30 is at an angle of roughly 45 degrees with respect to the pipe 12. As can be seen, since the retainer 16 and the plate 18 can rotate with respect to the pipe 12 (bearing and rotating against the ball 14, not shown in FIG. 2), both components can be installed flush against the ceiling 30. It is noted that the configuration shown in phantom (dotted) lines in FIG. 2 illustrates how a conventionally-installed pipe normally exists, such that the pipe is perpendicular to the ceiling 30. As can be appreciated the adjustable escutcheon assembly of the present invention can be used with pipes that are installed at various angles with respect to a wall or ceiling, including perpendicular as well as non-perpendicular pipe angles. For example, as illustrated in FIGS. 3-4, the adjustable angle escutcheon assembly allows for installation of the retainer 16 and plate 18 flush against a horizontal ceiling 30 as shown in FIG. 3, and against a vertical wall 28 as shown in FIG. 4. As can be seen in the illustrations shown in FIGS. 3-4, the pipe 12 is installed at various angles (e.g., non-perpendicular angles) with respect to the ceiling 30 and the wall 28.

Figure 5:
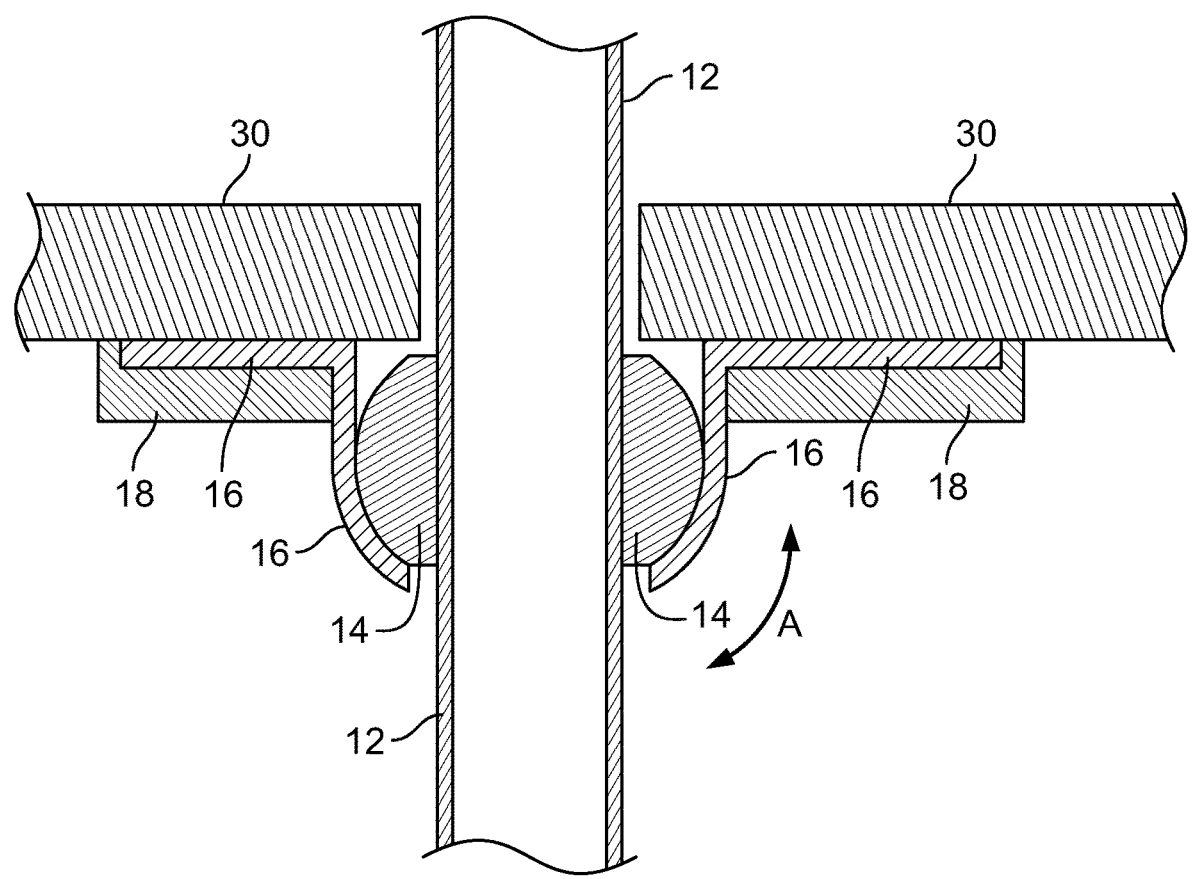
FIG. 5 is a cross-sectional view of the assembly of the present disclosure

FIG. 5 is cross-sectional view showing the adjustable escutcheon assembly in greater detail. As can be seen, the pipe 12 extends through an aperture in the ceiling 30, as well as through the ball 14, the retainer 16, and the decorative escutcheon plate 18. The retainer 16 bears against the ball 14, and is mounted flush against the ceiling 30 using any suitable means such as adhesives, screws, bolts, etc. When the retainer 16 is installed against the ceiling 30, it captures the ball 14 in position between the ceiling 30 and the retainer 16. The escutcheon plate 18 is attached to the retainer 16, and can be held in place against the retainer 16 using any suitable means, such as a friction fit, protrusions and corresponding recesses, set screw(s), adhesives, etc. Both the retainer 16 and the plate 18 can rotate with respect to the bearing 14 as illustrated by arrow A, thereby accommodating the angle formed between the wall 30 and the pipe 12. Thus, the assembly can accommodate various angles formed between the pipe 12 and the wall 30, including perpendicular and, importantly, non-perpendicular angles.

It is noted that the ball fitting 14, the retainer 16, and the decorative escutcheon plate 18 could be formed of any suitable materials such as metal (e.g., copper, brass, stainless steel, etc.), plastics, or other suitable materials as desired. Further, it is noted that the plate 18 is interchangeable with the retainer 16, so that a variety of different plates having different ornamental appearances could be utilized with the retainer 16.

Figure 6:
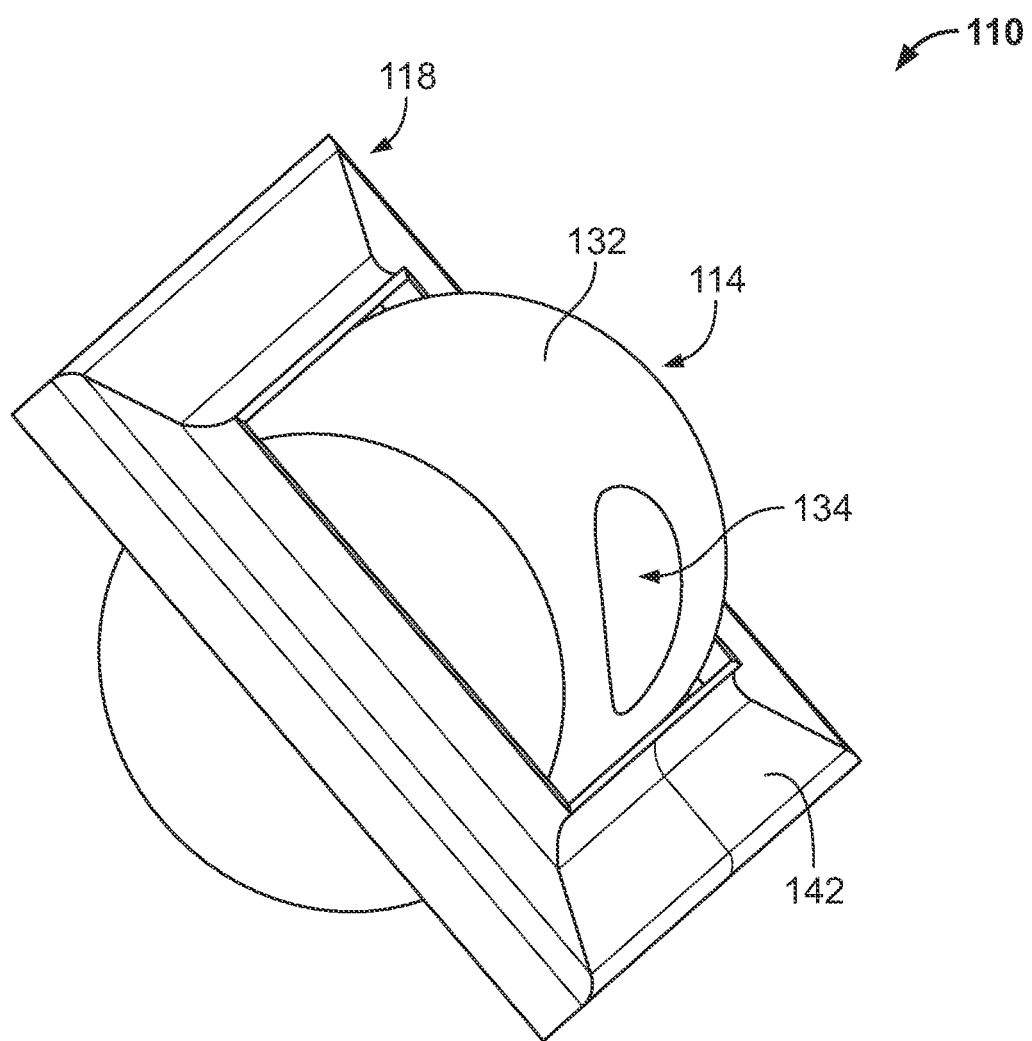
FIG. 6 is a perspective view of another escutcheon assembly of the present disclosure.
Figure 7:
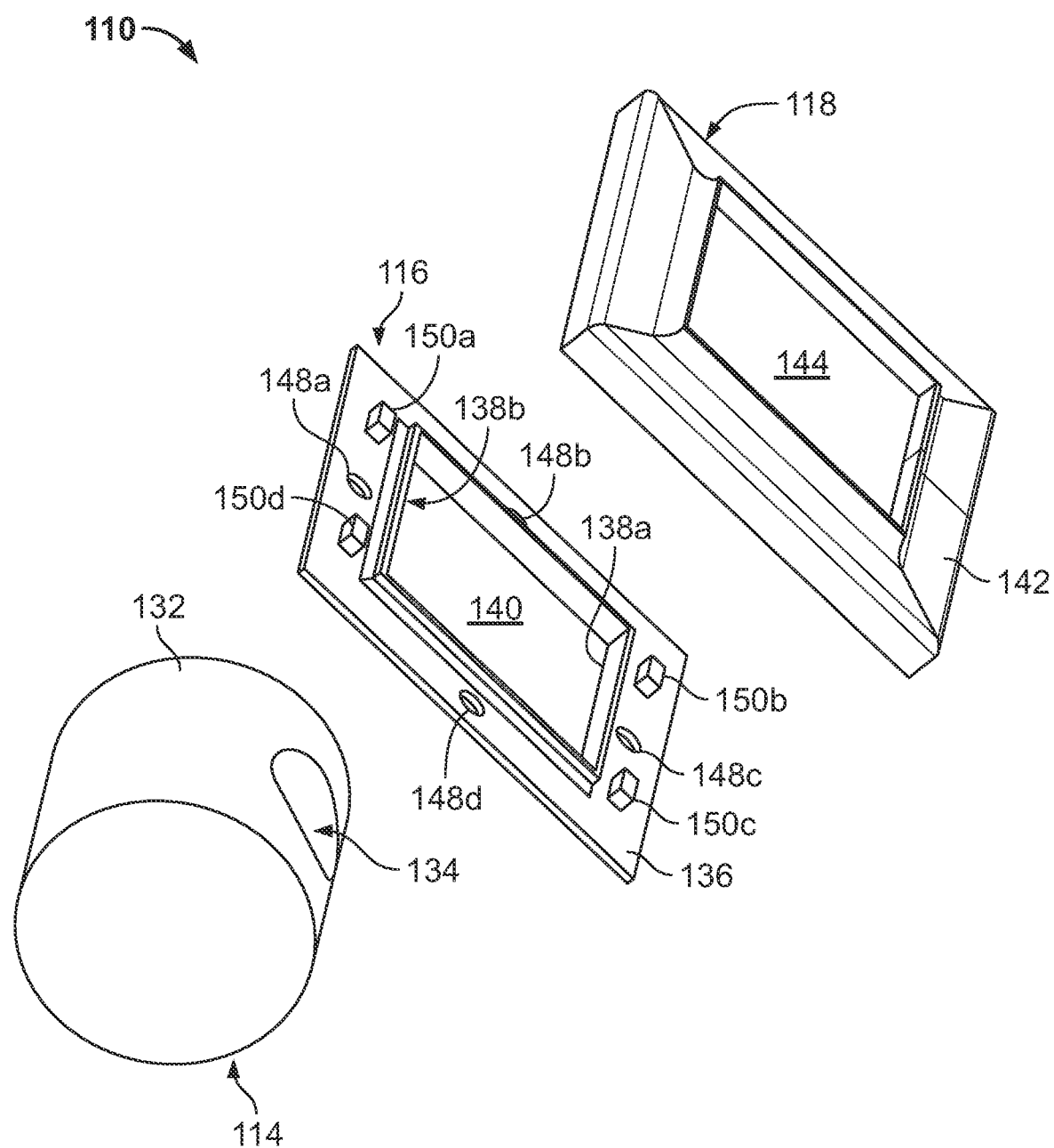
FIG. 7 is an exploded view of the escutcheon assembly of FIG. 6.
Figure 8:
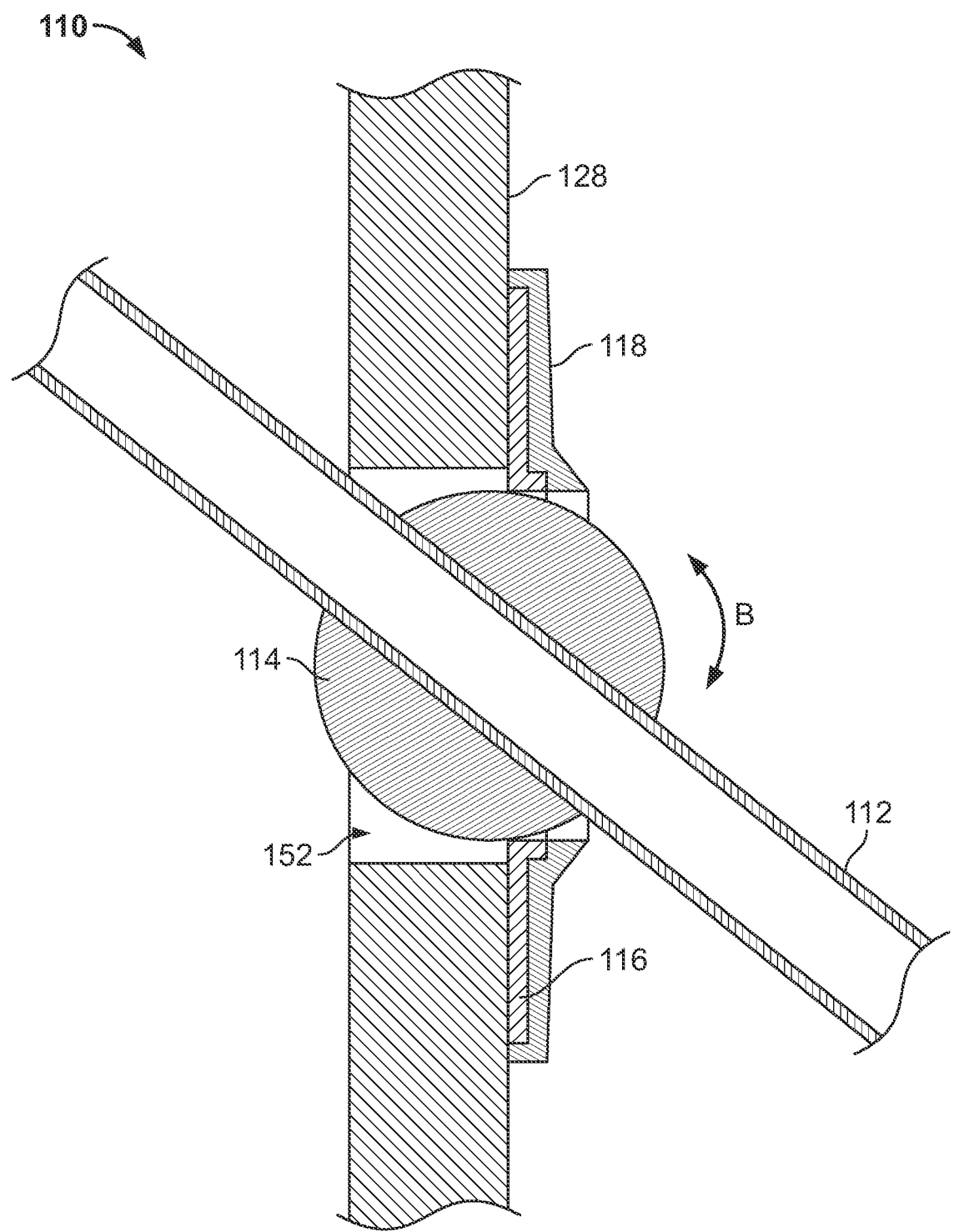
FIG. 8 is a cross-sectional view of the escutcheon assembly of FIG. 6, illustrating installation thereof.

FIGS. 6-8 illustrate another adjustable escutcheon assembly 110 of the present disclosure. More specifically, FIG. 6 is a perspective view of the adjustable escutcheon assembly 110, FIG. 7 is a an exploded view of the escutcheon assembly 110 (illustrating components thereof), and FIG. 8 is a partial cross-sectional view of the escutcheon assembly 110.

The assembly 110 includes a fitting 114 which receives a supply pipe 112 (see FIG. 8), such as a water supply pipe, an electrical conduit for a fixture, or the like, a retainer 116 that bears against and is adjustable with respect to the fitting 114, and a decorative escutcheon plate 118. The fitting 114 can be cylindrical in shape and can include an aperture 134 that extends therethrough and a curved bearing surface 132. The aperture 134 can extend through the center of the fitting 114 and can extend at an angle that is perpendicular to the longitudinal axis of the cylinder. The supply pipe 112 can be received by the aperture 134, such that the supply pipe extends through the fitting 134 (see FIG. 8).

The retainer 116 can include an aperture 140 that is sized and shaped to accept and retain the fitting 114. More specifically, the aperture 140 can have a width that is greater that or equal to a width of the fitting 114 and a height that is less than a diameter of the fitting 114. Accordingly, the retainer 116 can rotate with respect to the fitting 114, but the fitting 114 cannot pass through the retainer 116, when arranged as shown in FIGS. 6-8. The retainer 116 can include includes bearing surfaces 138a and 138b which can contact, and are slidably adjustable with respect to, the bearing surface 132 of the fitting 114. The fitting 116 can also include a mounting flange 136 that extends around the aperture 140 and the bearing surfaces 138a and 138b. The mounting flange 136 can be provided with one or more apertures 148a-d that are sized to accept screws, or other attachment mechanisms, for securing the fitting 116 to a wall or other surface (see, e.g., wall 128 shown in FIG. 8).

The decorative escutcheon plate 118 can be mounted to the retainer 116. As shown, the escutcheon plate 118 includes a central aperture 144 (through which the pipe 112 and at least a portion of the fitting 114 can extend), and a peripheral portion 142. The peripheral portion 142 of the plate 118 can include any desired decorative surface, ornamentation, shape, or the like, in order to provide a desired aesthetic look. The escutcheon plate 118 can be secured to the retainer 116 by way of tabs 150a-d that extend from the mounting flange 116 and corresponding detents or other corresponding structures (not shown) provided on an underside of the escutcheon plate 118, or other mechanisms known to those of ordinary skill in the art. As such, both the retainer 116 and the plate 118 can be rotated together so as to allow flush installation against the wall 128, a ceiling, or other surface through which the pipe 112 extends.

FIG. 8 is a partial cross-sectional view showing the adjustable escutcheon assembly 110 mounted to the wall 128 with the pipe 112 extending therethrough. As shown, the pipe 112 extends through an aperture 152 in the wall 128, as well as through the fitting 114, the retainer 116, and the decorative escutcheon plate 118. The aperture 152 and the fitting 114 can be sized such that the aperture 152 can accept the fitting 114 (e.g., the aperture 152 having a with greater than the fitting 114 and a height greater than the diameter of the fitting 114). Accordingly, the fitting 114 can be placed on the pipe 112 and moved therealong, into the aperture 152. The retainer 116 bears against the fitting 114, and is mounted flush against the wall 128 using any suitable mechanism such as adhesives, screws, bolts, etc. When the retainer 116 is installed against the wall 128, it secures the fitting 114 within the aperture 152 in the wall 128 and prevents movement of the fitting 114 relative to the pipe 112. According to other aspects of the present disclosure, the fitting 114 can be secured between the retainer 116 and the escutcheon plate 116. For example, similar to the retainer 116, the aperture 144 of the escutcheon plate 118 can have a width that is greater that or equal to the width of the fitting 114 and a height that is less than the diameter of the fitting 114, such that fitting 114 can rotate within the aperture 144 of the escutcheon plate 118, but cannot pass therethrough. The escutcheon plate 118 can also include bearing surfaces which can contact, and are slidably adjustable with respect to the bearing surface 132 of the fitting 114. Accordingly, the fitting 114 can be retained between the retainer 116 and escutcheon plate 118 and rotate therein.

The escutcheon plate 118 can be attached to the retainer 116 using the tabs 150a-d and reciprocal detents described herein, or using other suitable mechanisms known to those of skill in the art, including but not limited to, a friction fit, protrusions and corresponding recesses, set screw(s), adhesives, and the like. Both the retainer 116 and the plate 118 can rotate with respect to the fitting 114 as illustrated by arrow B, thereby accommodating the angle formed between the wall 128 and the pipe 112. More specifically, because the retainer 116 and the plate 118 can rotate with respect to the pipe 112 and fitting 114, both components can be installed flush against the wall 128. As will be appreciated, the adjustable escutcheon assembly 110 of the present disclosure can be used with pipes that are installed at various angles with respect to a wall, ceiling, or other surface, including perpendicular as well as non-perpendicular angles.

It is noted that the fitting 114, the retainer 116, and the decorative escutcheon plate 118 can be formed from various materials such as, but not limited to, metal (e.g., copper, brass, stainless steel, etc.), plastics, or other suitable materials as desired. Further, it is noted that the plate 118 is interchangeable with, and removable secured to, the retainer 116, so that a variety of different plates having different ornamental appearances could be utilized with the retainer 116. It is further noted that the adjustable escutcheon of the present disclosure could be made in two components including the decorative plate discussed herein (which could be ring-shaped) and the retainer described herein. In such circumstances, the retainer aids in installation, conceals mounting hardware, and facilitates the use of other decorative plates.

Having thus described the invention in detail, it is to be understood that the foregoing description is not intended to limit the spirit or scope thereof. It will be understood that the embodiments of the present invention described herein are merely exemplary and that a person skilled in the art may make any variations and modification without departing from the spirit and scope of the invention. All such variations and modifications, including those discussed above, are intended to be included within the scope of the invention.

What is claimed is:

1. An adjustable escutcheon assembly, comprising:
a cylindrical fitting having a curved bearing surface and a first aperture sized to receive a pipe, the first aperture transverse to the curved bearing surface and passing through the fitting and the curved bearing surface;
a retainer having a second aperture and a mounting flange extending around the second aperture, the second aperture sized to receive and bear against the curved bearing surface of the fitting such that the retainer is rotatable with respect to the curved bearing surface; and an escutcheon plate mounted to the retainer and having a third aperture sized to receive the curved bearing surface of the fitting, wherein
the pipe extends from a wall at an angle relative thereto and the retainer and escutcheon plate are rotatable with respect to the fitting, such that the mounting flange can be mounted flush against the wall, thereby accommodating the angle formed between the pipe and the wall.

2. The escutcheon assembly of claim 1, wherein movement of the fitting along the pipe is prevented by the retainer when the retainer is mounted to the wall.

3. The escutcheon assembly of claim 1, wherein the retainer includes one or more bearing surfaces disposed about a perimeter of the second aperture which bear against the curved bearing surface of the fitting.

4. The escutcheon assembly of claim 1, wherein the second aperture has a height that is less than the diameter of the fitting and a width that is equal to the width of the fitting.

5. The escutcheon assembly of claim 1, wherein the fitting extends into an aperture in the wall when the retainer is mounted to the wall.

6. The escutcheon assembly of claim 1, wherein the escutcheon plate is removably attached to the retainer.

7. The escutcheon assembly of claim 1, wherein the retainer and escutcheon plate are rotatable with respect to the fitting, thereby accommodating a plurality of angles formed between the pipe and the wall.

8. The escutcheon assembly of claim 1, wherein the mounting flange includes a first mechanism for attaching the retainer to the wall and a second mechanism for attaching the escutcheon plate to the retainer.

9. The escutcheon assembly of claim 1, wherein the third aperture has a height that is less than the diameter of the fitting and a width that is equal to the width of the fitting.

10. The escutcheon assembly of claim 9, wherein the fitting is captured between the retainer and the escutcheon plate and rotatable therein.

11. The escutcheon assembly of claim 10, wherein the curved bearing surface of the fitting is retained by and rotatable against one or more bearing surfaces disposed about a perimeter of the second aperture and one or more bearing surfaces disposed about a perimeter of the third aperture.

\* \* \* \* \*